United States Patent
Jansen et al.

(10) Patent No.: US 10,215,924 B2
(45) Date of Patent: Feb. 26, 2019

(54) OPTICAL INTERCONNECT WITH HIGH ALIGNMENT TOLERANCE

(71) Applicant: IMEC VZW, Leuven (BE)

(72) Inventors: Roelof Jansen, Heverlee (BE); Xavier Rottenberg, Kessel-Lo (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 15/851,051

(22) Filed: Dec. 21, 2017

(65) Prior Publication Data
US 2018/0180816 A1    Jun. 28, 2018

(30) Foreign Application Priority Data

Dec. 22, 2016 (EP) .................................... 16206417

(51) Int. Cl.
*G02B 6/293* (2006.01)
*G02B 6/125* (2006.01)
*G02B 6/12* (2006.01)

(52) U.S. Cl.
CPC ..... *G02B 6/29332* (2013.01); *G02B 6/12002* (2013.01); *G02B 6/125* (2013.01); *G02B 6/29331* (2013.01)

(58) Field of Classification Search
None
See application file for complete search history.

(56) References Cited

U.S. PATENT DOCUMENTS

| | | |
|---|---|---|
| 7,486,853 B2 | 2/2009 | Cunningham et al. |
| 8,948,555 B1 | 2/2015 | Roth et al. |
| 2003/0003738 A1 | 1/2003 | Delwala |
| 2004/0202418 A1 | 10/2004 | Ghiron et al. |
| 2004/0223680 A1 | 11/2004 | Block et al. |
| 2005/0175286 A1 | 8/2005 | Patel et al. |
| 2013/0259420 A1 | 10/2013 | Yoshida et al. |

FOREIGN PATENT DOCUMENTS

| | | |
|---|---|---|
| EP | 0 584 005 A1 | 2/1994 |
| WO | 2004/088715 A2 | 10/2004 |

OTHER PUBLICATIONS

European Search Report, European Patent Application No. 16206417.4, dated Apr. 26, 2017, 7 pages.

*Primary Examiner* — Jerry Rahll
(74) *Attorney, Agent, or Firm* — McDonnell Boehnen Hulbert & Berghoff LLP

(57) ABSTRACT

An example embodiment may include an optical system for obtaining radiation coupling between two waveguides positioned in a non-coplanar configuration. The optical system may include a first waveguide positioned in a first plane and a second waveguide positioned in a second plane. The first waveguide may be stacked over the second waveguide at a distance adapted to allow evanescent coupling between the first waveguide and the second waveguide. The first waveguide and the second waveguide may be configured such that the coupling is at least partly tolerant to relative translation or rotation of the first waveguide and the second waveguide with respect to each other.

14 Claims, 3 Drawing Sheets

OPTICAL INTERCONNECT WITH HIGH ALIGNMENT TOLERANCE

CROSS-REFERENCE TO RELATED APPLICATIONS

The present application is a non-provisional patent application claiming priority to European Patent Application No. 16206417.4, filed Dec. 22, 2016, the contents of which are hereby incorporated by reference.

FIELD OF THE DISCLOSURE

The disclosure relates to the field of optical interconnects. More specifically it relates to interconnection between optical components via evanescent coupling through waveguides.

BACKGROUND

Coupling radiation between two optical chips, e.g. in a stack of optical chips can be done in a variety of ways, such as for example using an optical fiber. For example, radiation propagating in a waveguide in one optical chip, can be transferred to a second optical chip by butt-coupling an optical fiber between the waveguide in the one optical chip and a waveguide in the second optical chip. Nevertheless, coupling between waveguides and an optical fiber typically results in relative high losses and may require accurate alignment.

In order to circumvent these problems, the connection between optical chips is usually performed using further aids, such as tapered intermediate waveguides (which add up new components and more losses) and gratings. Nevertheless, also these connections still suffer from large losses and the need for accurate alignment.

Some conventional mechanisms require no intermediate features such as optical fibers or tapered waveguides or gratings. These mechanisms are based on evanescent wave radiation. When radiation is travelling in a waveguide, the major portion is propagating in the core, but a small portion of the radiation extends outside the core of the waveguide. This radiation, referred to as evanescent radiation, has a strongly decreasing intensity profile with distance from the core. Nevertheless, if a neighboring waveguide is sufficiently close to the first waveguide, evanescent radiation from the first waveguide can be coupled into the neighboring waveguide and in this way coupling of radiation between the two waveguides can be obtained. Such coupling typically is referred to as evanescent wave coupling. Nevertheless, conventional evanescent wave couplers still require accurate alignment in order to guarantee that accurate coupling occurs.

SUMMARY

Some embodiments described herein provide an efficient and tolerant radiation coupling between two sets of integrated optical waveguides that are not co-planar, e.g. that are on different substrates.

In some embodiments, couplers are provided that are less prone to rotation between the different planes, during manufacturing and/or during installation or use, wherein the optical waveguides are positioned.

In some embodiments, couplers are provided between waveguides integrated in different layers of a same optical chip.

In some embodiments, optical interconnects are provided between waveguides integrated in different optical chips positioned in a same stack.

The present disclosure relates to an optical system for obtaining radiation coupling between two waveguides positioned non-coplanar, the optical system comprising a first waveguide positioned in a first plane, a second waveguide positioned in a second plane, the first waveguide being stacked over the second waveguide at a distance adapted to allow evanescent coupling between the first waveguide and the second waveguide. The first and second waveguides are configured such that the coupling is at least partly tolerant to relative translation or rotation of the waveguides with respect to each other.

The first and second waveguides may be shaped so as to form at least two coupling regions for the evanescent coupling, wherein the coupling efficiency of the distinct coupling regions is sensitive to relative translation or rotation of the waveguides with respect to each other but wherein the coupling efficiency of the combined coupling regions is substantially less sensitive to relative translation or rotation of the waveguides with respect to each other. In some embodiments, evanescent coupling between two non-coplanar waveguides may be obtained with a high tolerance to horizontal waveguide misalignment caused for example by relative translation or rotation of the waveguides with respect to each other. Some embodiments may allow for a high coupling efficiency to be obtained. In some embodiments, the misalignment in the coupling area and the modes of the waveguide in one region compensates the misalignment in the second region, thus making the coupling substantially insensitive to horizontal lateral and angular translation.

The axis of the first and/or the second waveguide may comprise a direction shift.

The first and/or the second waveguide may form a corner, such that there are two separated coupling regions between the two waveguides. In some embodiments, a misalignment in one region may be compensated by a counter misalignment in the second region.

The first and/or the second waveguide may form a curved bent, such that there are two separated coupling regions between the two waveguides.

The waveguide may comprise a chamfered corner. In some embodiments, losses may be minimized along the corner, obtaining an effective transmission of light through the waveguide.

The first and second waveguides may have a spiral shape.

The first waveguide may have a different radius of curvature than the second waveguide. In some embodiments, losses are minimized along the corner, obtaining an effective transmission of light through the waveguide.

A perpendicular projection of the second spiral shaped waveguide on the first plane may be inscribed in the first spiral shaped waveguide.

The perpendicular projection of the second spiral shaped waveguide on the first plane may overlap with the second spiral shaped waveguide.

The perpendicular projection of the second spiral shaped waveguide on the first plane may not overlap with the second spiral shaped waveguide but may be in close proximity, allowing evanescent wave coupling.

The first and second waveguide may be crossing each other thus forming a single coupling region.

Each of the first and second waveguide may be included in a respective substrate, the substrates being stacked and fixed on top of each other with the waveguides in proximity for allowing evanescent coupling.

The present disclosure also includes a photonics circuit comprising an optical system as described above, the photonics circuit comprising two photonics substrates, wherein the optical coupling between the two photonics substrates is obtained using the optical system. In some embodiments, an auxiliary coupling element might not be necessary, which may allow for a compact integrated circuit with little or no losses.

The present disclosure also relates to a diagnostic device comprising an optical system as described above.

Particular and preferred aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

Figure 1:
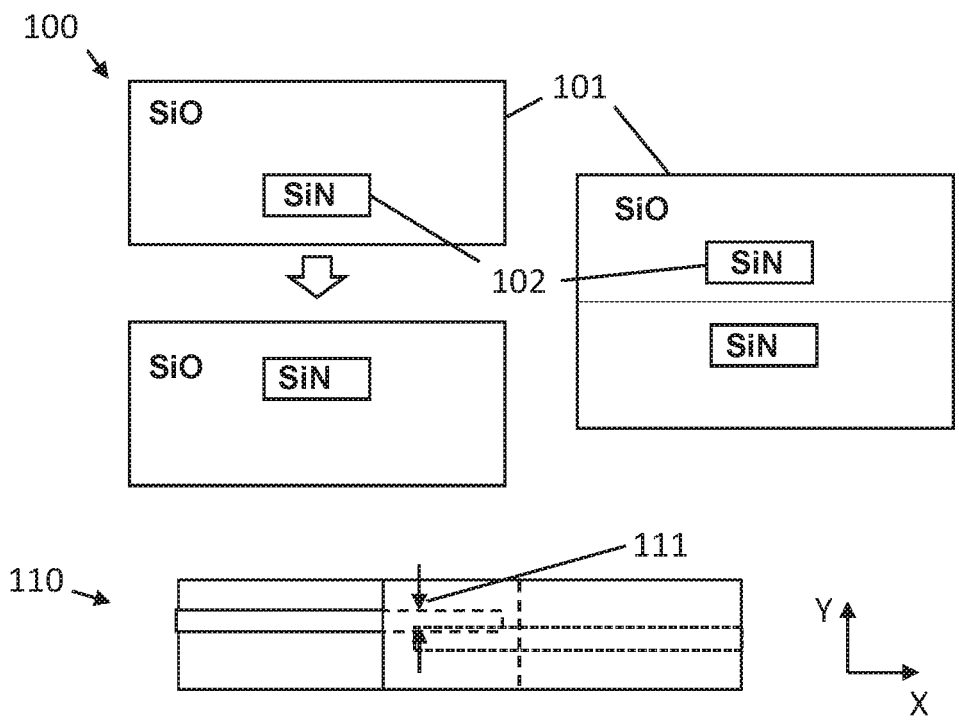
FIG. 1 illustrates a schematic cross section of two waveguides being coupled by evanescent coupling (upper drawings), and the top view of the coupled waveguides showing influence of small misalignments (lower drawing) in an existing coupling, according to an example embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that the disclosure requires more features than are expressly recited in each claim. Rather, as the following claims reflect, aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that some embodiments may be practiced without these specific details. In other instances, conventional methods, structures and techniques have not been shown in detail in order not to obscure an understanding of this description.

Where in some embodiments reference is made to "bent", reference is made to a change of direction or direction shift. This may be smooth (curve) or forming a corner.

Where in some embodiments reference is made to "stack" reference is made to put two "stackable" objects in close contact to each other. For example, two substrates can be stacked by placing one on top of the other, or in general one next to the other, wherein the main surfaces of the substrates are in contact, forming a double layered stack.

FIG. 1 shows a conventional coupling between two waveguides. The front view 100 of a proper, aligned coupling and top view 110 of two misaligned waveguides. As an example, the waveguides comprise silicon oxide cladding 101 and a buried silicon nitride core 102, but the discussion would be equivalent with any other type of waveguide. The coupling efficiency of the coupler is strongly dependent on the horizontal (XY) and angular alignment between the waveguides (or the substrates containing them), as well as the vertical gap between the guides. For example, as shown in the top view 110 of FIG. 1, in narrow waveguides, e.g. of approximately half micron thickness, an accidental and usual misalignment 111 of 500 nm would negatively affect or even frustrate the transmission of light between waveguides.

In a first aspect, the present disclosure relates to a waveguide geometry adapted to provide radiation coupling (e.g. evanescent coupling) between optical waveguides that are not positioned co-planar. An optical system is presented, which allows obtaining radiation coupling (e.g. by evanescent coupling) with low losses between two waveguides positioned in a non-coplanar position with respect the other. The effect of translating or rotating the waveguides, during manufacturing or during use, has only a limited effect on the coupling efficiency. The optical system according to some embodiments comprises at least a first waveguide positioned in a first plane and at least a second waveguide positioned in a second plane. The planes may be defined in different planes of a same substrate or chip, or they may be defined in different substrates, e.g. different optical chips. In the latter case, the optical system described may be seen as an optical interconnect between different chips. Such different chips may for example be different chips from a stack. According to some embodiments, the first and second waveguides are positioned at a distance adapted to allow evanescent coupling between the first waveguide and the second waveguide (for example, the waveguides may be stacked on top of each other). Further the waveguides are configured such that the overall coupling between the waveguides is at least partly tolerant to translation or rotation of the waveguides with respect to each other.

Some embodiments provide a tolerance to misalignments of waveguides, e.g. to rotational misalignments of the waveguides. In some embodiments, where an X-type crossing of waveguides is used, typically any x-y tolerance can be compensated for. These embodiments are merely limited by the space the structure is taking up. In some other embodiments, where a spiral type of waveguides is used, x-y tolerances can be compensated for in first order, but if larger variations occur, the compensation will be less effective. The actual tolerance will depend on the gap occurring between the different waveguides.

With respect to angle tolerances that can be compensated for, double crossing waveguides can be used. The compensation is first order resulting in a desirable compensation for small angle variations. The compensation will be less efficient for large angular mis-alignments, e.g. 10° and above. The effect is completely cancelled out once one arm of the waveguide is parallel to an arm of the other waveguide. For the spiral/ring type, it can be very tolerant to angular tolerance, especially for circular, big spirals. The only change in coupling length is the part of the two spirals which are not aligned any more.

The integrated waveguides may be any type of waveguide, such as for example
    a buried channel waveguide, in which a core is completely surrounded by cladding material, e.g. a SiN core completely surrounded by silicon oxide, the waveguide being on top of a planar substrate or being stand-alone;
    an embedded guide, in which a core material is embedded in the surface of a cladding substrate, e.g. a four-sided SiN core strip in which three sides are embedded and in contact with a $SiO_2$ planar substrate, and the fourth side of the core is in contact with air;
    a ridge waveguide comprising a core on top of a substrate of lower index (e.g. a Si core on top of a silicon oxide planar substrate), or a rib waveguide, comprising a core on top of a layer with the same optical index as the core, on top of a substrate with a lower index (e.g. a Si core and Si substrate, on top of a silicon oxide substrate), and in both cases (ridge and rib) surrounded by air or other cladding,;
    a strip-loaded waveguide, comprising a planar core (e.g. Si or SiN) on top of a planar substrate (e.g. $SiO_2$), the planar core further comprising a strip of material with lower index than that of the core (e.g. $SiO_2$), all surrounded by further cladding material (e.g. air).

Other materials with suitable optical indices can be used, for example polymers (PMMA, etc.), glass, ternary and quaternary compounds, silicon oxynitride cores with silicon substrates, etc. Other suitable configurations of a channel waveguide (bulge guide, etc) may be used.

The waveguides in some embodiments are stackable (e.g. vertically) in a way that coupling of light between the waveguides can be realized through evanescent waves, by so-called evanescent coupling, which is a conventional technique to couple light from one waveguide to another. Two guides placed close together support an anti-symmetric and symmetric mode with different propagation constants, and by choosing the correct coupling length, the beating pattern can be used to control the transmission of radiation. The efficiency of the coupling should be as tolerant as possible to the alignment or placement of the waveguides, such as waveguides in chips. In some embodiments, the geometrical configuration of one waveguide with respect to the other waveguide reduces the sensitivity of horizontal alignment between the waveguides, by providing waveguides and waveguide arrangements relative to each other such that the evanescent coupling is substantially the same with respect to displacements of the waveguides with respect to each other, so a coupling with high tolerance to misalignments can be obtained. The coupling length, for example, may be substantially the same for at least two relative positions, or for relative random displacements, such as misalignments.

The configuration may provide geometrical lateral compensation, angular compensation, or a combination thereof where evanescence transmission takes place between the two stacked waveguides. Thus, if misalignment is introduced in the waveguides, the compensated coupling will not be affected and the transmission of light would not be substantially the same. Alignment requirements become relaxed, improving coupling and saving production times, thus increasing production yield. In some embodiments, the channel waveguides are provided on substrates, e.g. planar substrates, such as semiconductor (e.g. Si, silicon oxide, Ge, GaAs, etc.) substrates, and the substrates are vertically stacked, for example partially or fully overlapping. The substrates of the waveguides may be comprised in a photonics chip, an interconnect board, or any other planar substrate that may comprise a waveguide. This allows light transmission between photonic chips or platforms to be easily realized with high alignment tolerance (chip-to-chip, chip-to-interconnect, interconnect-to-interconnect, etc.), with no need to use intermediate waveguides or tapers. The disclosure may be applied to the coupling light between two different waveguides, for example coupling between a ridge waveguide and an embedded waveguide, or between a ridge and rib waveguide, or waveguides with different compositions each of core and/or cladding. However, the present disclosure is not limited to waveguides on top of different substrates, and it may be applied to coupling between other waveguides, for example to light coupling between two buried channel waveguides, and also benefit from high alignment tolerance.

In an example embodiment, stable coupling is provided between two waveguides, one on top of the other, although the present disclosure can be applied to more than two. In some embodiments, the materials comprising the upper and lower substrate and waveguides are the same, but they may be different. For example, the substrate may be a semiconductor wafer such as a silicon oxide, GaAs, etc., but may be quartz, glass, etc. For example, the waveguide (WG) may comprise silicon nitride, GaAlAs, etc. For chip to chip coupling, the two guides form a coupler when the two chips are bonded or connected together. Optional adhesion may be provided between the waveguides, e.g. between the substrates or chips, for example a thin layer of optical adhesive in the contact area, or any other suitable fixing means, may be provided.

By way of illustration, different embodiments will be discussed in more detail, each illustrating embodiments showing a certain degree of intolerance of the coupling efficiency to translation and/or rotation of the waveguides with respect to each other.

Figure 2:
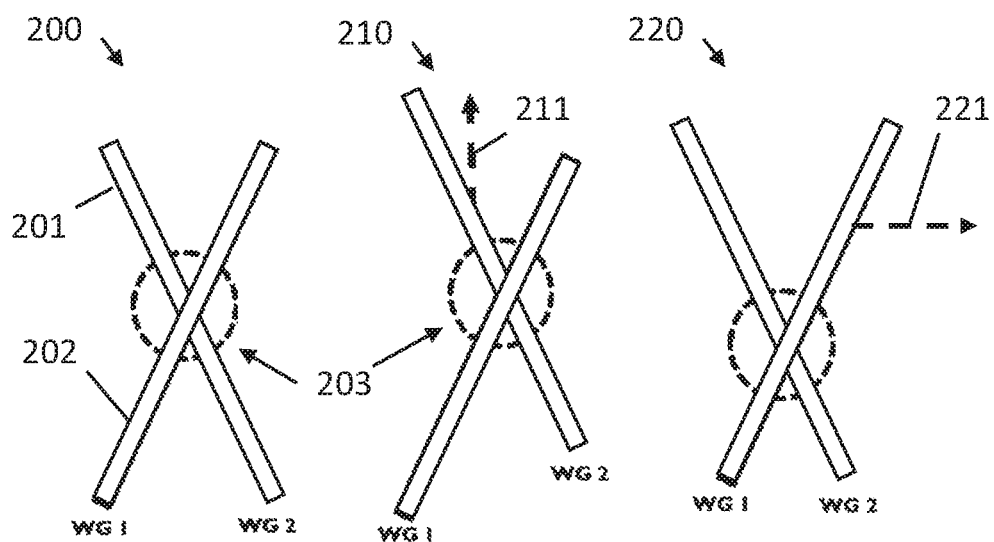
FIG. 2 illustrates the concept of crossing-type couplers under the influence of translation misalignment, according to an example embodiment.

In one embodiment, a crossing-type coupler is provided. FIG. 2 shows, at the leftmost drawing 200, two non-coplanar waveguides 201, 202 designed to cross at a predetermined angle (the angle is larger than 0°, when seen in the perpendicular projection on one of the planes wherein the waveguides are positioned), thereby forming a coupling area 203. Light transmission is provided via evanescent coupling. The coupling region 203 presents the same area of overlap and the same coupling modes even if a horizontal translation occurs. As long as the translation is within the limits of the waveguide length, no significant change will occur in the coupling region. The structure 210 in the central drawing shows the structure after one of the waveguides had a translation 211 towards the direction Y, and the structure 220 at the rightmost of FIG. 2 shows the structure after one of the waveguides had a translation 221 towards the X direction. In the three cases, the area and angle of the coupling area 203 is the same, thus the coupling will not change with displacement. In some embodiments, a crossing type coupler thus is provided, which conserves the beating mode and alleviates the sensitivity to horizontal misalignment for translation, for example the coupling does not substantially change if one of the WGs is displaced with respect to the other.

In other embodiments, the overall coupling area does not exist from a single region but in two or more distinct coupling regions. In contrast to the situation shown in FIG. 2, whereby only a single coupling region is provided, in some embodiments at least two distinct coupling regions are present. The coupling efficiency of these coupling regions independently is somehow sensitive to relative translation and/or rotation of the waveguides with respect to each other. However, the combined coupling efficiency of the coupling regions is substantially less sensitive to relative translation and/or rotation of the waveguides with respect to each other.

Figure 3:
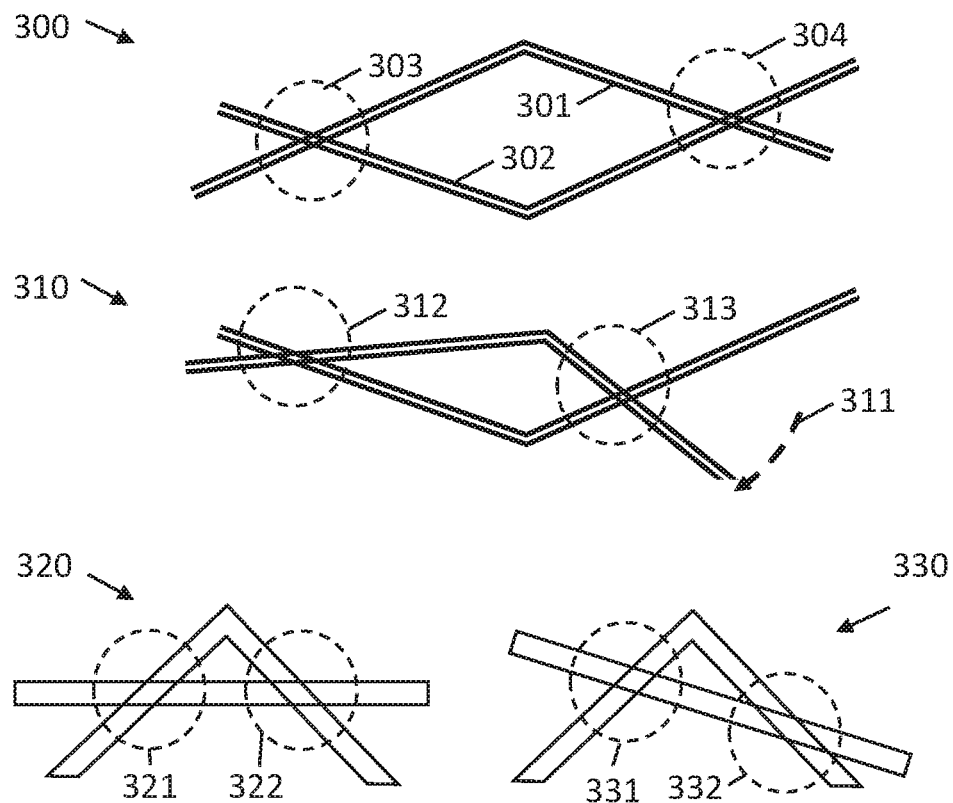
FIG. 3 illustrates an example double crossing-type coupler showing two coupling regions under the influence of angular misalignment, for the case of coupling between two waveguides comprising a bent, and for the case of coupling between a waveguide comprising a bent and a straight waveguide, according to an example embodiment.

In an example embodiment, a double crossing-type coupler is presented in FIG. 3. Herein, the axis of the waveguide along which the light is transmitted presents a shift of direction, for example a zig-zag, a corner, (which is easy to implement), or a curve or chamfered corner (which present low losses), on any other suitable technique to change the direction of the propagation of light. The zig-zag configuration can be used in one or two waveguides, as shown in FIG. 3. In the crossing-type coupling shown in the previous FIG. 2, the length of the coupling region, as well the modes, are controlled by the angle between the guides, which makes this design still sensitive to angular misalignment between the two chips. To counteract this sensitivity to angular misalignment, a zigzag configuration can be implemented in the waveguide during fabrication. In this configuration, the two waveguides 301, 302 are bent or, in general, change the direction of light propagation. In some embodiments, only one of the waveguides show a direction shift in the axis.

The direction shift is performed in such way that the two waveguides show two coupling regions 303, 304 between them. In some embodiments, each waveguide is bent in a predetermined angle, for example an obtuse angle. The angle may for example be less than 90 degrees, e.g. less than 45 degrees, e.g. less than 20°. The angle may be selected such that coupling is high or highest. The angles made in the waveguide may be average angles, since sharp corners are avoided in order to allow the optical mode to follow the waveguide. The waveguides may be bent. The coupling factors of the two regions are influenced by adding an angular component. As shown in the lower drawing 310, in an angular misalignment 311, the influence in one coupling region is opposite with respect to the other region due to the zig-zag configuration. A misalignment angular component is added to each region, but they are opposite and cancel out. In the example shown in FIG. 3, a variation in the first coupling area 312 is compensated by a variation in the second coupling area 313. The same discussion can be made for the lowest drawings, in which a single waveguide presents a bent, while the other is straight. The influence in one coupling region 321 is opposite to the other 322, so that in the case there is a misalignment (e.g. angular misalignment, as shown in the lowest rightmost drawing 330), the change in coupling efficiency in the first coupling area 331 is compensated by a change in coupling efficiency in the second coupling area 332.

Multiple coupling regions can be provided by introducing a number of zig zags. For example, a first waveguide may present two bends, or three, and the second waveguide may present no bend, or one, two or more bends (e.g. corners), thus allowing the number of coupling regions to increase.

For example, three coupling regions can be obtained in case of a waveguide with two corners and a straight waveguide, or two waveguides of the same dimensions with two corners, or more than three coupling regions, etc.)

The present disclosure is not limited to crossing-type couplings and couplers. In some embodiments, the waveguides do not need to intersect when stacked. As long as there is evanescent coupling between them, the compensation of the present disclosure can be applied. For example, coupling may be based on proximity between two waveguides. The present disclosure provides a configuration such that a misalignment would create two coupling areas, one with stronger coupling (shorter distance, hence enhanced evanescent wave transmission) than the other (longer distance, thus weaker transmission).

Figure 4:
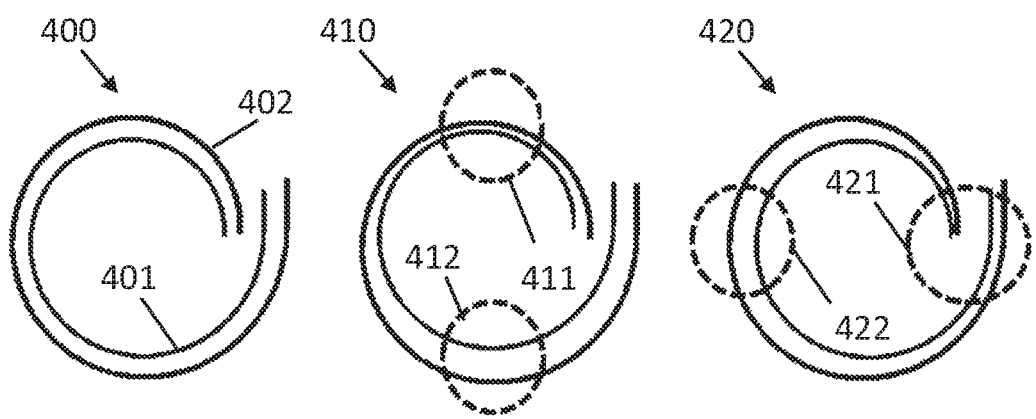
FIG. 4 illustrates an example spiraling coupler showing two coupling regions under the influence of misalignment, according to an example embodiment.

For example, a spiral-type structure 400 is proposed in FIG. 4, where the spiraling waveguide 401 on one chip is smaller (e.g. have different radius, e.g. smaller radius) than the other spiraling waveguide 402. The waveguides have a geometry such that evanescent coupling takes place in the region between the guides, for example both waveguides are in close proximity. When the spirals are misaligned (e.g. by a translation in the Y axis, as in the central drawing 410, or by a translation in the X axis, as in the rightmost drawing 420), the increased coupling on one side 411, 421 is compensated by the reduced coupling 412, 422 on the other side of the coupler. In some embodiments, the spirals may overlap. In particular embodiments, the waveguides present the same type and radius of spiral. Any misalignment would be compensated like in the case of crossing-type waveguides presenting curved bent.

Figure 5:
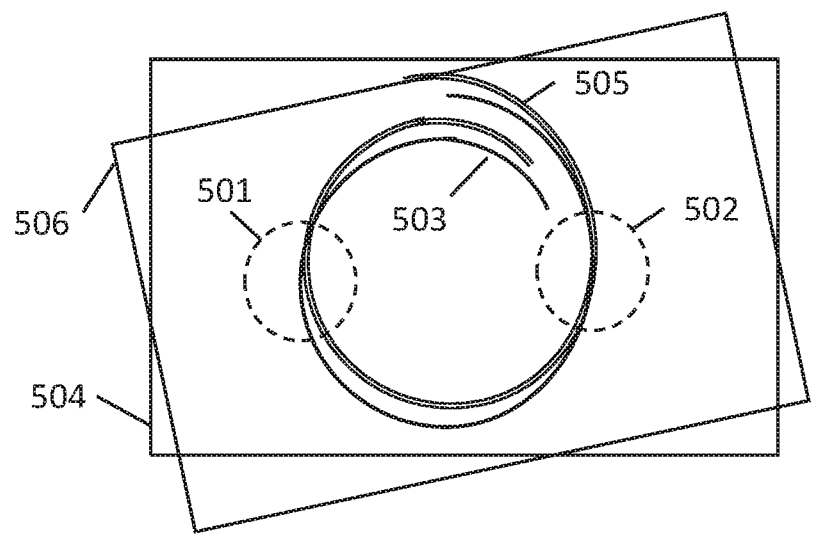
FIG. 5 illustrates another example spiraling coupler showing two coupling regions under the influence of misalignment of two substrates comprising two waveguides of the same radius.

Spiral waveguides may present the same projected shape and curvature, which means that both have the same radius and shape, but one spirals out clockwise, and the other counter-clockwise. If there are misalignments, as seen in FIG. 5, there are still two compensated coupling regions 501, 502 according to some embodiments, between a spiraling waveguide 503 in a first substrate 504 and a spiraling waveguide 505 in a second substrate 506, which shows strong misalignment but still allows coupling. In this case, the configuration of the coupling is crossing-type, allowing overlap between the spiral waveguides.

Some embodiments may allow a flexible manufacture of integrated photonic circuits, because alignment requirements are relaxed, saving time consuming alignment steps and increasing production of reliable chips In some embodiments, a compact device can be obtained, because there is no need of extra coupling waveguides or tapers. Through this method, for example, an optical interposer can be used to spread light coupled from a source (for example a laser or a vertical-cavity surface-emitting laser VCSEL) to different integrated chips.

Some embodiments of interconnect designs can be applied to optical data processing, thereby obtaining connections between different chips. It can be applied to photonics circuits and to specialized devices, such as diagnostics devices.

In a further aspect of the present disclosure, a photonics circuit and a diagnostics device, including some embodiments of the optical system, are shown.

Figure 6:
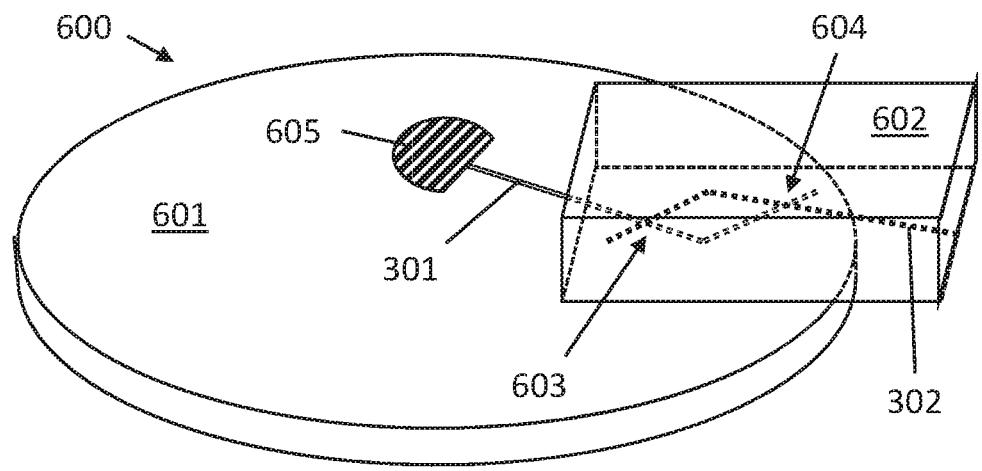
FIG. 6 illustrates a photonics circuit and a diagnostics device, according to an example embodiment.
Figure 6:
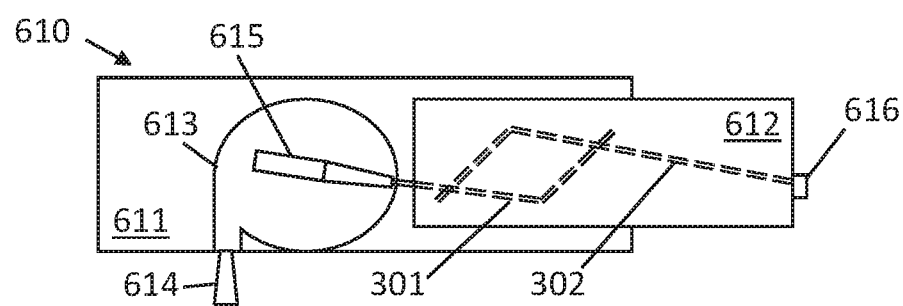

FIG. 6 shows, in the upper drawing 600, an example of photonics circuit, where in a surface of a first substrate 601 there is included a waveguide 301 comprising a bend, and in a surface of a second substrate 602 there is included a second waveguide 302 comprising a bend. The waveguides of the first and second substrate are bent in opposite directions. For example, the axis of the first waveguide is bent to the left, and the axis of the second waveguide to the right, so that when the two surfaces containing the waveguides are put in contact (e.g. stacked), two coupling regions 603, 604 are formed. The present disclosure is not limited thereto, and both bends may have the same orientation but an angle so different that at least two coupling regions still may be formed. The photonics circuit may comprise further features such as gratings 605, tapers, integrated lasers or connections for these, VCSEL, other devices, light pumps, photoelectric devices, sensors, readers, detectors, filters, etc.

FIG. 6 also shows, in the lower drawing 610, an example of application for a diagnostics device. Two substrates 611, 612, as before, may be included. For example, a first substrate 611 may comprise a microfluidics transparent platform 613, the microfluidics platform having an inlet 614 for allowing fluids to enter, example, and a waveguide 301 for sending radiation to the taper and grating 615, for example for irradiating the fluids in microfluidics platform 613 for sensing purposes. The fluids may be for example a medical fluid sample. The further photonics substrate 612 includes a second waveguide 302 for bringing the radiation into the waveguide 301 of first substrate 611 and into the microfluidics platform. The coupling is performed according to some embodiments of the present disclosure. The second substrate 612 may comprise for example an integrated tunable laser or a connection 616 for a laser, and/or gratings, tapers, arrayed waveguides, etc.

In summary, some embodiments of an optical system can be readily applied to a photonics circuit comprising. It may be also applied to diagnostics devices, for example Point-of-Care devices, portable devices, microfluidic analysis and sensors, etc. These devices may obtain coupling between the photonic platforms without extra connections, tapers, gratings or coupling features, with an alignment-tolerant coupling, and low losses.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. An optical system for obtaining radiation coupling between two waveguides positioned in a non-coplanar configuration, the optical system comprising:
    a first waveguide positioned in a first plane; and
    a second waveguide positioned in a second plane, wherein the first waveguide is stacked over the second waveguide at a distance adapted to allow evanescent coupling between the first waveguide and the second waveguide, wherein the first waveguide and the second waveguide have a spiral shape, and wherein the first waveguide and the second waveguide are configured such that the coupling is at least partly tolerant to relative translation or rotation of the first waveguide and the second waveguide with respect to each other.

2. The optical system according to claim 1, wherein the first waveguide and the second waveguide are shaped so as to form at least two coupling regions for the evanescent coupling, wherein a coupling efficiency of the distinct coupling regions is sensitive to relative translation or rotation of the first waveguide and the second waveguide with respect to each other but wherein the coupling efficiency of the combined coupling regions is substantially less sensitive to relative translation or rotation of the first waveguide and the second waveguide with respect to each other.

3. The optical system according to claim 2, wherein an axis of the first waveguide or the second waveguide comprises a direction shift.

4. The optical system according to claim 2, wherein the first or the second waveguide forms a corner, such that there are two separated coupling regions between the first waveguide and the second waveguide.

5. The optical system according to claim 2, wherein the first waveguide or the second waveguide forms a curved bent, such that there are two separated coupling regions between the first waveguide and the second waveguide.

6. The optical system according to claim 5, wherein the first waveguide or the second waveguide comprises a chamfered corner.

7. The optical system according to claim 1, wherein the first waveguide has a different radius of curvature than the second waveguide.

8. The optical system according to claim 1, wherein a perpendicular projection of the second spiral shaped waveguide on the first plane is inscribed in the first spiral shaped waveguide.

9. The optical system according to claim 1, wherein a perpendicular projection of the second spiral shaped waveguide on the first plane overlaps with the second spiral shaped waveguide.

10. The optical system according to claim 1, wherein a perpendicular projection of the second spiral shaped waveguide on the first plane does not overlap with the second spiral shaped waveguide but is in close proximity, allowing evanescent wave coupling.

11. The optical system according to claim 1, wherein the first waveguide and the second waveguide are crossing each other thus forming a single coupling region.

12. The optical system according to claim 1, wherein each of the first waveguide and the second waveguide are included in respective substrates, the substrates being stacked and fixed on top of each other with the first waveguide and the second waveguide in proximity for allowing evanescent coupling.

13. A photonics circuit comprising an optical system according to claim 1, wherein the photonics circuit comprises two photonics substrates, wherein an optical coupling between the two photonics substrates is obtained using the optical system.

14. A diagnostic device comprising an optical system according to claim 1.

* * * * *